June 29, 1926.

O. A. BRIDGES 1,590,924

METHOD OF AND APPARATUS FOR FEEDING GLASS

Filed Nov. 25, 1918     2 Sheets-Sheet 1

WITNESSES
J. Herbert Bradley.

INVENTOR
Orville A. Bridges

June 29, 1926.  1,590,924
O. A. BRIDGES
METHOD OF AND APPARATUS FOR FEEDING GLASS
Filed Nov. 25, 1918   2 Sheets-Sheet 2
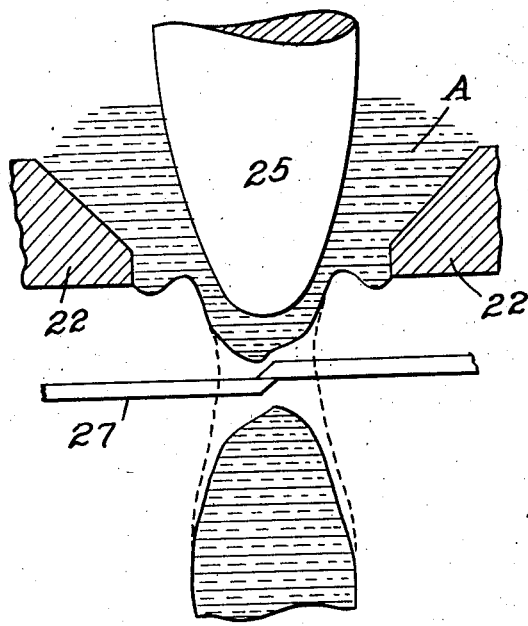
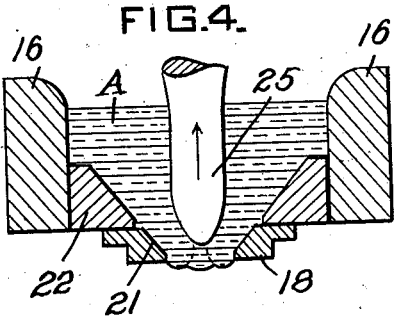
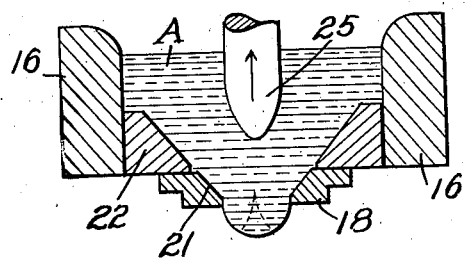
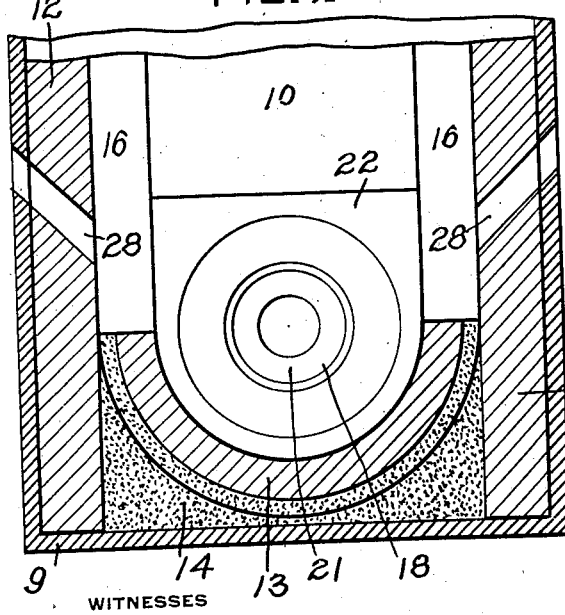
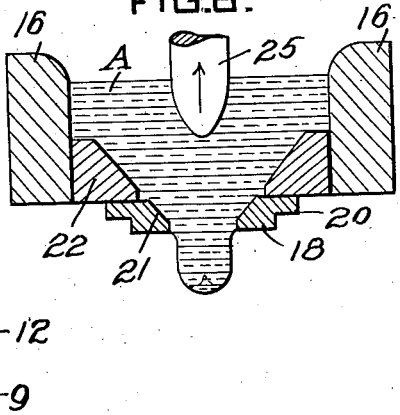
INVENTOR
Orville A. Bridges Patented June 29, 1926.

1,590,924

UNITED STATES PATENT OFFICE.

ORVILLE A. BRIDGES, OF ZANESVILLE, OHIO, ASSIGNOR, BY MESNE ASSIGNMENTS, TO HARTFORD-EMPIRE COMPANY, OF HARTFORD, CONNECTICUT, A CORPORATION OF DELAWARE.

METHOD OF AND APPARATUS FOR FEEDING GLASS.

Application filed November 25, 1918. Serial No. 264,015.

This invention relates to methods of feeding molten glass and more particularly to methods for feeding uniform batches or quotas of molten glass by gravity through a flow orifice located in the bottom of a glass furnace tank, extension or the like.

An object of this invention is to so control the effective area of the gravity flow orifice that uniform quotas free from streaks or blisters and of the desired contour or shape are delivered.

Another object is to provide a method whereby the flow through the orifice is so retarded by a punty which is caused to pass through the orifice and enter the depending mass from above that said mass is transferred to the punty and sustained by it until severed.

A further object is to provide a method whereby the quotas delivered by gravity and transferred to the punty are suspended by the punty until they stretch and assume the desired contour.

A further object is to provide a method whereby use is made of the fact that a layer of molten glass upon exposure to the air congeals or increases its viscosity to seal the flow orifice at the proper time during the upward movements of the punty.

Another object is to provide a method whereby a severing neck of reduced cross section is formed at the upper end of each quota delivered by gravity through a flow orifice.

A still further object is to provide a method whereby the bit of glass remaining on the nose of the punty after each quota has been severed therefrom is thoroughly incorporated in the molten glass forming the succeeding quota.

These, as well as other objects which will readily appear to those skilled in this particular art, I attain by means described in the specification and diagrammatically presented in the drawings accompanying and forming a part of this application.

In the drawings, throughout which similar elements are denoted by like characters, Fig. 1 somewhat diagrammatically illustrates a furnace extension in sectional elevation with a bath of molten glass therein and flowing therefrom through the discharge or flow orifice, and with the punty-like plunger at its upward limit of movement.

Fig. 2 is a view in vertical cross section of the furnace extension and illustrates the plunger in its lowest position. At this position the flow of glass through the orifice is retarded and by the congealing of the glass surrounding the nose of the plunger below the orifice the continuity of the flow from the reduced orifice to the body of glass is interrupted or checked and the function of suspending the quota of glass is assumed by the plunger. This transfer occurs just prior to the upward movement of the plunger and the operation of the shears (which in this view are shown in inoperative position) to sever the quota from the plunger.

Fig. 3 is a fragmentary enlarged vertical cross section diagrammatically illustrating the punty nosed plunger in its initial upward movement just as the batch or quota of glass of predetermined quantity delivered and transferred to the plunger has been severed by the shears. The quota is shown dropping away from the shears and the glass bit adhering to the nose of the plunger is shown carried upwardly thereon from the shears. The dotted lines indicate the contracted neck formation assumed by the quota or batch depending from the plunger just prior to its severance therefrom by the shears.

Fig. 4 is a vertical cross sectional view diagrammatically illustrating the punty on its return movement at the point where the bit of glass left thereon has not been entirely absorbed or incorporated into the body of molten glass in the outlet orifice.

Figs. 5 and 6 are views similar to Fig. 4 but show the punty at higher points in its upward travel and these views by dotted lines illustrate the incorporation of the bit in the mass flowing down through the outlet orifice, and Fig. 7 is a more or less diagrammatic plan view of the furnace extension with the top wall thereof removed.

Figure 1:
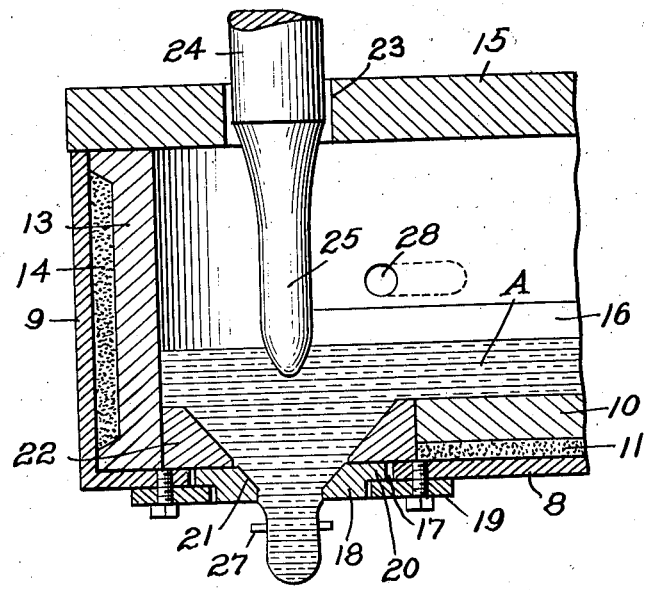

It will be understood that this invention is not confined to any particular type of receptacle for containing the bath of molten glass but may be practiced with any suitable receptacle having a bottom flow orifice.

For the purpose of illustrating this invention I have shown a glass furnace extension in which a body or bath of molten glass A, preferably (but not necessarily) maintained by gravity flow from the furnace proper is kept in the desired fluid condition by means of suitable heating means.

The extension chosen for illustration comprises a metal box-like structure having a bottom 8 and side and end walls 9 rising therefrom. The central portion of the floor of the extension is formed of blocks 10 of suitable refractory material and between these blocks and the bottom member 8 an insulating lining 11 of asbestos is provided. The sides of the extension are lined with suitable blocks 12 of refractory material and a curved block 13 lines the end of the extension. Between block 13 and the end wall 9 insulating material such as asbestos 14 is interposed. A cover 15 of refractory material rests on side blocks 12 and end block 13.

On each side of central floor blocks 10 and between them and the side lining blocks 12 I provide blocks 16 of suitable refractory material for the purpose of more thoroughly insulating the glass bath A since these blocks extend above the level of the bath.

Bottom member 8 of the box-like extension is provided with a circular opening 17 within which a ring 18 of refractory material is supported by means of an annular support plate 19 which underlies a portion 20 of said ring and is secured to bottom member 8 by means of suitable bolts as illustrated.

For the purpose of alining the flow orifice 21 of ring 18 the greatest diameter of the ring is made less than the diameter of opening 17 and, after alinement, the ring may be securely clamped in position by means of said bolts and support plate 19. The forward end of the extension is provided with a floor or lining block 22 which rests upon bottom member 8 and overhangs ring 18 and against the lower face of which ring 18 is held in adjusted position by its support plate. The forward end of floor block 22 is curved to conform to the inner curved surface of end block 13.

The bore or opening of ring 18 is tapered or beveled to form an efficient flow orifice. Block 22 is provided with an orifice or opening having tapered walls conforming to the taper of the walls of flow orifice 21.

Figure 2:
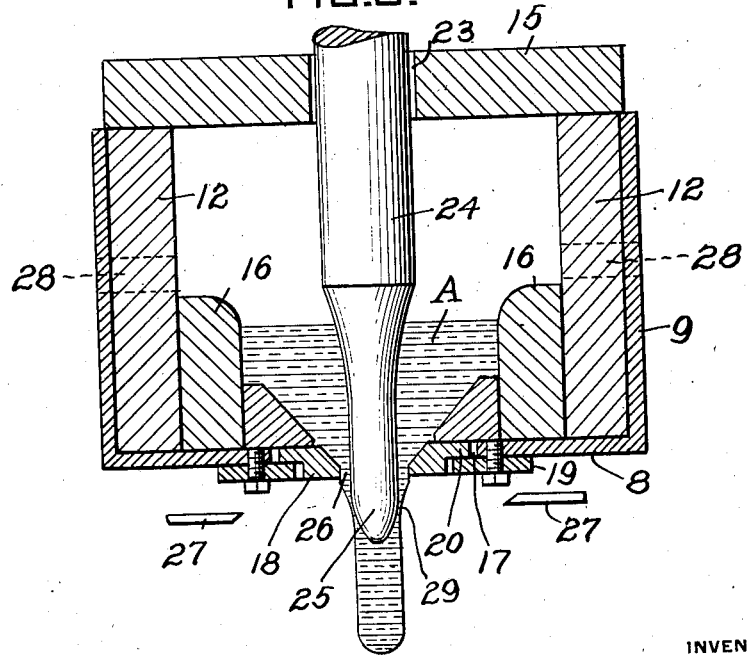

Cover 15 in line with the flow orifice is provided with an opening 23 through which a plunger 24, having a punty-like nose 25, is adapted to reciprocate. The plunger is mounted above the extension and by means of suitable mechanism arranged to reciprocate in axial alinement with the flow orifice. The greatest diameter of the lower end of the plunger which is tapered to form a punty, and which will hereinafter be referred to as the punty, is sufficiently less than the diameter of the flow orifice to permit of a reduced flow of molten glass through the annular orifice 26 formed between the punty and the walls of the orifice when the punty is in its lowermost position, as shown in Fig. 2.

Any suitable means may be provided for reciprocating the punty and controlling both the speed and length of the strokes thereof according to the fluidity of the molten glass and the results desired. Such operating means for example may consist of a power cylinder as shown in my Patent No. 1,121,608 of December 22, 1914, for operating the punty, or if desired the punty may be linked up to suitable levers so as to be operated by hand.

Suitable glass severing or shearing means 27 are provided to operate in a horizontal plane below the flow orifice and below the punty when in its initial upward movement. These shears if desired may be connected up so as to operate synchronously with the punty or they may be operated manually.

As it is necessary to maintain the glass bath A in the desired state of fluidity, openings or burners 28 are provided for admitting a suitable combustible mixture of air and gas to be burned in the extension above the glass bath. These burners will be regulated so that the bath is maintained in the proper condition for working.

In practicing this invention, the diameter of the flow orifice as well as the diameter and shape of the punty will be chosen with regard to the size and form of the quotas of glass to be delivered. When the bath has reached a condition where the gravity drop of the glass is approximately twelve feet per minute it is permitted to flow down through the orifice, and the amount, forming each quota, which is permitted to depend therefrom is controlled by the movements of the putty. The flow is not entirely stopped with the punty at the limit of its downward movement. In the initial upward movement of the punty the glass flowing through the orifice, reduced in area by the punty which is centrally located therein is drawn up with the punty by reason of the adhesion thereto; this upward movement momentarily stops the downward flow through the orifice. The flow of glass through the orifice starts as soon as the nose of the punty in moving upward is elevated above the lower face of the flow orifice and the flow continues until the punty begins its next upward movement, after having been lowered into the flow orifice.

Approximately the required quantity of glass to form a quota is delivered through the orifice by the time the punty reaches the last stage of its downward stroke (as shown in Fig. 2) in which position the nose of the punty projects below the lower face of the orifice.

As the punty is of less diameter than the orifice the flow of glass is not completely stopped at this position but is sufficiently retarded to cause the diameter of the depending quota to decrease due to stretch, and since the layer of glass which surrounds the punty (between its nose and the lower face of the flow orifice) congeals or has its viscosity increased by exposure to the air the adhesion between the glass and the punty is increased so that the quota of glass is transferred to the punty; in other words the punty assumes the function of suspending the quota.

As soon as the transfer to the punty takes place the quota begins to stretch and draw down from the punty. Immediately upon reaching its lowermost position the punty starts upon its return or upward stroke and the upward movement in conjunction with the downward draw or movement of the quota due to gravity, accelerates the stretch of the quota thus forming a contracted neck at its upper end. The instant this neck or contraction is formed the shears are operated to sever the neck whereupon the quota of glass of predetermined quantity drops into the mold, container or conveyor arranged below the shearing device. The shears are arranged so as to cut the glass below the point of the punty nose leaving a layer or bit of glass (as shown in Fig. 3) remaining on the punty.

Since the punty is moving upward when the shears operate to sever the neck, it will be apparent that the shears do not support or uphold the glass bit during the shearing operation.

After the neck has been severed and during the continuing upward movement of the punty the glass bit is reheated by contact with the molten glass in the flow orifice and is gradually drawn and stretched from the nose of the punty until it is completely melted and incorporated in the mass of glass. This is graphically illustrated in Figs. 4 to 6, inclusive. Fig. 4 shows the glass bit in the act of being gradually drawn from the punty nose at the point in the upward movement of the punty where the glass is beginning to flow through the orifice in the formation of the next quota. Figs. 5 and 6 show the plunger in still higher positions with the glass bit entirely separated from the punty nose and being gradually absorbed or incorporated into the mass of glass flowing through the orifice while in Fig. 1, which shows the punty approximately at the upward limit of its upward movement, the glass bit is entirely absorbed.

The punty in its downward movement through the bath of glass is not intended to assist the flow of glass through the orifice, and, since the punty is of less diameter than the orifice any tendency toward acceleration is minimized. The downward speed of the punty will preferably not exceed the speed or gravity drop of the molten glass. The punty serves as a timer for controlling the amount flowing through the orifice for each quota and also as a means for suspending the quota during the shearing operation. The shearing operation may be timed to occur when that portion of the contracted neck immediately below the punty is substantially at rest brought about by the initial upward movement of the punty and the simultaneous downward stretch of the quota due to gravity.

In order to form quotas of glass of longer length and of smaller diameter than the normal mass depending from the flow orifice, the speed of the punty as well as the depth to which it penetrates the depending mass is regulated. By increasing the speed beyond the normal gravity movement of the mass of glass flowing through the orifice at the inception of and during the punty's penetration therein, the downward movement of the quote is accelerated thereby causing an elongation of the depending mass before it is severed.

The functions of the punty's downward movements are threefold, first, the retarding of the flow through the orifice; second, the penetration of the mass so as to form a sheath or envelope of molten glass 29, around the nose of the punty, this congeals and in so doing the adhesion between the glass and the nose of the punty is increased and the function of supporting the quota below the punty is thereby transferred from the flow orifice to the punty; third, the control of the elongation and diameter of the quota. The functions of the punty's upward movements are likewise threefold, first, the formation of the contracted neck for efficient severance; second, the momentary stopping of the flow of glass through the orifice; and, third, the elevation of the glass bit adhering to the punty into the molten glass for incorporation therein.

The speed of movement of the punty after severance of the quota is controlled according to the fluidity of the bath and will be such as to assure removal of the glass bit from the punty nose and incorporation thereof in the succeeding quota to prevent the formation of blisters, streaks or other defects in the quotas.

The size of the quotas is determined by varying the period between the punty's cycles, dependent upon the mobility or fluidity of the molten glass, and also by varying the size of the flow orifice. The nose of the punty can be varied in length and form to suit various conditions and requirements, for instance, a short nosed punty will cause the glass batch to form a sudden contraction and short neck at the severing point while a longer nosed punty will cause the glass batch to form a more gradual contraction or longer neck.

The gas for supplying burners 28 may be derived from any suitable source such as a producer or from a source of natural gas supply, and the deliverance of the quotas may be timed so as to synchronize with any of the well known types of semi-automatic machines used for pressing and blowing glass articles and thus the entire operation from the formation of the quota to the delivery of the finished article may be made automatic.

The effective portion of the punty is maintained at approximately the same temperature as the bath of glass and therefore as it does not cool and therefore congeal the glass immediately surrounding it, the size of the remaining bit is reduced to a minimum.

It will be understood that the relative diameters of the punty and the flow orifice may be varied so as to intensify or minimize the effects produced by the functions of the punty upon the depending body of glass.

It will also be understood that severance of the depending body of glass may, if desired, take place prior to the formation of the contracted neck.

Having thus described my invention what I claim is—

1. The method of serving predetermined quotas of glass from a mass of molten glass, which consists in permitting a body of glass to flow from said mass, in retarding said flow by the downward movement of a punty into said flowing body, in attaching said body at its upper end to said punty and supporting it thereon, in interrupting the flow from the mass of molten glass by the upward movement of said punty and then in severing said body and permitting it to drop by gravity.

2. The method of serving predetermined quotas of glass from a mass of molten glass, which consists in permitting a body of glass to flow by gravity from said mass, in inserting a punty into said flowing body from above in such manner that said body is transferred to said punty, in supporting said body from said punty until a top contracted neck is formed thereto and then in severing said neck and permitting the body to drop by gravity.

3. The method of serving predetermined quotas of glass from a mass of molten glass contained in a receptacle having a bottom flow orifice, which consists in permitting a body of glass to flow by gravity through said orifice, in moving a punty through said orifice and into said flowing body whereby at the downward position of the punty the flow of glass is retarded and the said body transferred to said punty, in supporting said body from said punty until it stretches and forms a top contracted neck, in raising said punty within said orifice and then while moving in severing said neck and permitting the body to drop by gravity.

4. The method of serving predetermined quotas of glass from a mass of molten glass contained within a receptacle having a bottom flow orifice, which consists in permitting a body of glass to flow by gravity through said orifice, in inserting a punty through said orifice into said body of glass whereby the flow through said orifice is retarded and the body of glass depending from said orifice is transferred to and supported by said punty, in allowing said body to stretch to reduce its diameter and to form a top contracted neck thereto, in interrupting the flow through said orifice by upward movement of said punty and then in severing said neck during said upward movement and permitting said body to drop by gravity.

5. The method of serving predetermined quotas of glass from a mass of molten glass, which consists in permitting a body of glass to flow by gravity from said mass, in inserting a punty into said flowing body from above in such manner that the function of supporting said body is assumed by said punty, in allowing said body to stretch until a contracted neck is formed at the upper end thereof, in severing the body from said punty at said neck.

6. The method of serving predetermined quotas of glass from a mass of molten glass, which consists in permitting a body of glass to flow by gravity from said mass, in inserting a punty into said flowing body from above in such manner that the function of supporting said body is assumed by said punty, in allowing said body to stretch until a contracted neck is formed at the upper end thereof, in raising said punty and then simultaneously therewith in severing said body and permitting it to drop by gravity.

7. The method of serving predetermined quotas of glass from a mass of molten glass, which consists in permitting a body of glass to flow by gravity from said mass, in moving a punty into the upper end of said body thereby retarding the flow from said mass, in interrupting the flow from said mass by the movement of said punty, in severing said body at its upper end and simultaneously therewith lifting the glass supported by said punty from the severing means.

8. The method of serving predetermined quotas of glass from a mass of molten glass, which consists in permitting a body of glass to flow by gravity from said mass, in inserting a punty into said flowing body from above in such manner that said body is transferred to said punty, in supporting said body from said punty until a top contracted neck is formed thereto and then in severing said neck and delivering said body.

9. The method of serving predetermined quotas of glass from a mass of molten glass contained in a receptacle having a bottom flow orifice, which consists in permitting a body of glass to flow by gravity through said orifice, in moving a punty through said orifice and into said flowing body whereby the flow thereof is retarded and the support of said body transferred to said punty, in supporting said body from said punty until it stretches and forms a top contracted neck, in raising said punty within said orifice and then while moving in severing said neck and delivering said body.

10. The method of feeding quotas of glass from the bottom orifice of a receptacle containing a bath of molten glass, which consists in permitting a body of glass to flow through said orifice, in retarding the flow through said orifice when the required amount is depending therefrom by the movement of a punty thrust into the upper end of the depending mass, in raising said punty and with it the depending mass and then in severing said mass from said punty and delivering said mass.

11. The method of serving predetermined quotas of glass from a mass of molten glass, which consists in permitting a body of glass to flow by gravity from said mass, in inserting a punty into said flowing body from above in such manner that said body is transferred to said punty forming elongated quotas of said body of glass, in supporting said body from said punty until a top contracted neck is formed thereto and then in severing said neck and permitting the body to drop by gravity.

12. The method of serving predetermined quotas of glass from a mass of molten glass contained in a receptacle having a bottom flow orifice, which consists in permitting a body of glass to flow by gravity through said orifice, in moving a punty through said orifice in such a manner that the flow therethrough is retarded and the gravity movement of the depending mass transferred thereto is accelerated forming an elongated quota of said depending mass, in raising said punty within said orifice and then while moving in severing said mass below the punty and permitting the mass to drop by gravity.

13. The method of serving predetermined quotas of glass from a mass of molten glass, which consists in permitting a body of glass to flow by gravity from said mass, in retarding said flow by the movement of a punty, in attaching said body to said punty in such manner that the gravity drop of said body is thereby accelerated, in elongating said body, in interrupting the flow from the mass of molten glass by the movement of said punty and then severing and delivering said body.

14. The method of serving predetermined quotas of glass from a mass of molten glass, which consists in permitting a body of glass to flow by gravity from said mass, in inserting a punty into said flowing body from above in such a manner that the downward movement of said body is hastened thereby and transferred thereto, in supporting and then severing said body and allowing said body to drop.

15. The method of feeding quotas of glass from the bottom orifice of a container supplied with a bath of molten glass, which consists in permitting a body of glass to flow from said orifice, in transferring said body to a punty by said punty's downward movement, in severing said body during the upward movement of said punty and thereby retarding the flow from said orifice.

16. The method of feeding quotas of glass from the bottom orifice of a receptacle containing a bath of molten glass, which consists in permitting a body of glass to flow through said orifice, in transferring said body to a punty and simultaneously retarding the flow from the mass by the downward movement of said punty through said orifice into the depending body of glass, in interrupting the flow from said mass by the upward movement of said punty and simultaneously severing the depending body and lifting the remaining upper portion of depending body from the severing means.

17. The method of serving quotas of glass from the bottom orifice of a receptacle supplied with molten glass, which consists in permitting a body of glass to flow and depend from said orifice, in inserting a punty from above into the upper end of said depending body of glass, in interrupting the flow of glass from said orifice by the upward movement of said punty and severing said body of glass during the initial upward movement of said punty.

18. The method of serving quotas of glass from the bottom orifice of a receptacle supplied with molten glass, which consists in permitting a body of glass to flow and depend from said orifice, in plunging the point of a punty from above into the upper end of said depending body of glass, in reversing the movement of said punty, in severing said body of depending glass and elevating above severing means the upper remaining portion of depending body of glass simultaneously with the initial reverse movement of said punty.

19. The method of serving quotas of glass from the bottom of a receptacle supplied with molten glass, which consists in permitting a body of glass to flow and depend from said orifice, in moving a punty from above through said orifice into the upper end of said depending body of glass, in moving said punty up and simultaneously therewith in interrupting the flow from said orifice and lifting the upper portion of depending body of glass remaining after severance up from severing means.

20. The method of serving quotas of glass from the bottom orifice of a receptacle supplied with molten glass, which consists in permitting a body glass to flow and depend from said orifice, in penetrating the upper end of said depending body of glass by a punty descending from above through said orifice, in momentarily reversing the flow of glass from said orifice by the upward movement of said punty and simultaneously therewith in severing the body of depending glass below the point of said punty and lifting the remaining portion of glass up from severing means.

21. Apparatus for feeding molten glass, comprising a refractory container having an opening in its floor, a casing enclosing the side and the bottom of the container and having a corresponding opening, a block in the container opening having a tapered orifice larger on the inside, a ring below the block forming a continuation of the orifice, means for securing the ring to the casing in register with the block, and a reciprocable plunger having a tapered end movable within the orifice.

22. Apparatus for feeding molten glass, having in combination a receptacle having an opening in its floor, a block having an orifice of downwardly decreasing diameter in said opening, a refractory ring having a similar orifice secured below the block, and a reciprocating plunger movable in the outlet formed by the two parts.

In testimony whereof, I have hereunto subscribed my name this 21st day of November, 1918.

ORVILLE A. BRIDGES.